3,549,259
POLARISCOPE
Filed Dec. 12, 1967
2 Sheets-Sheet 1
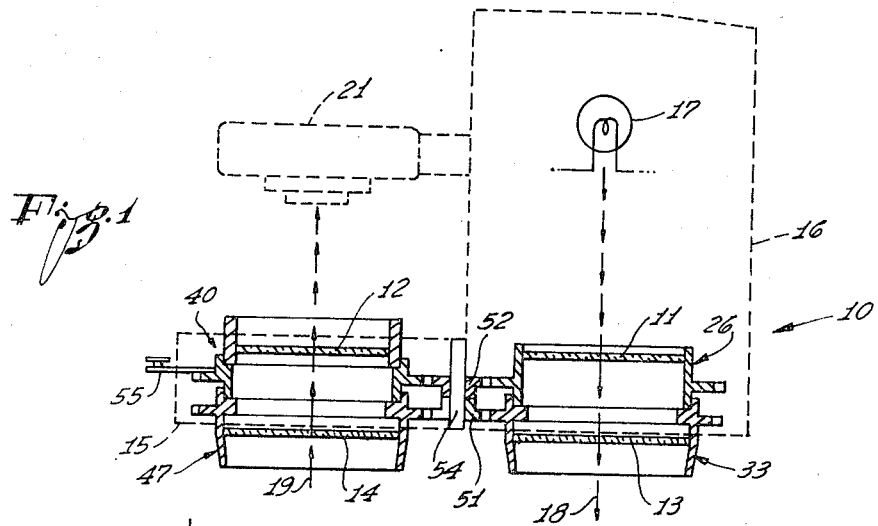
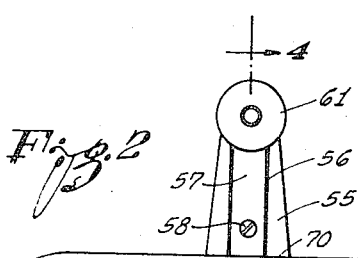
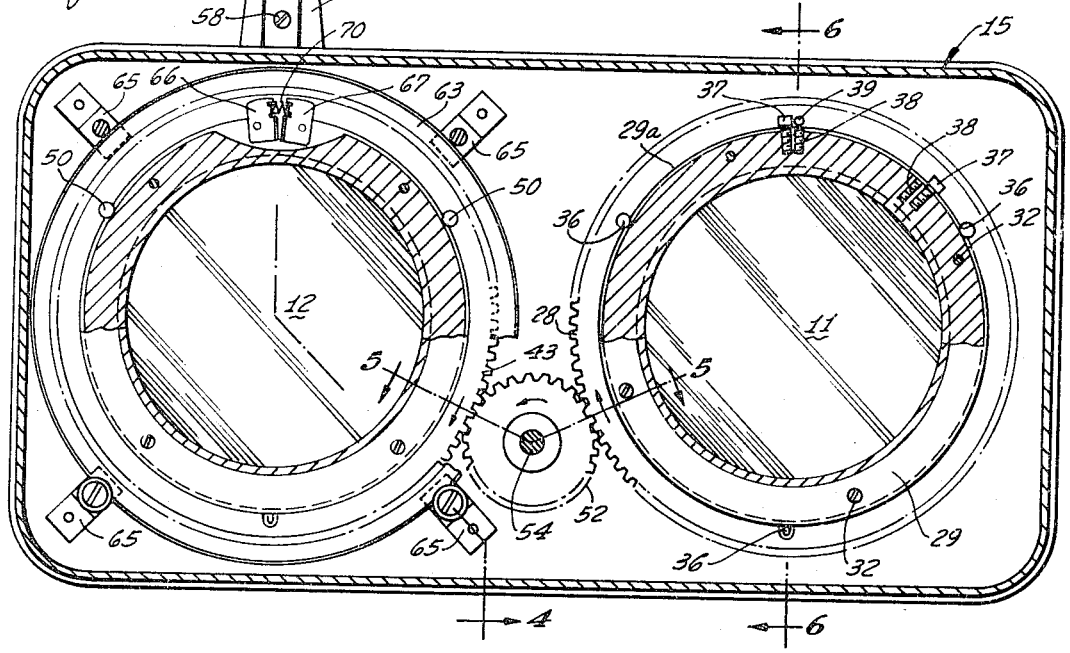
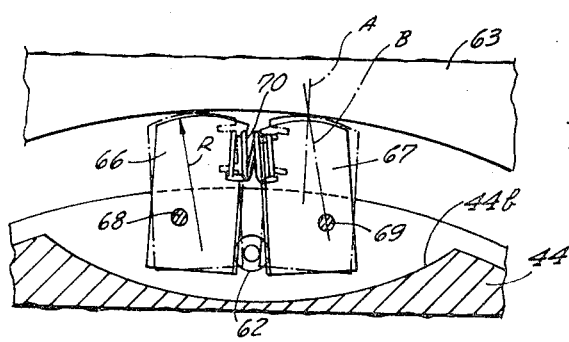
INVENTOR:
George A. Klatchko
ATTORNEY

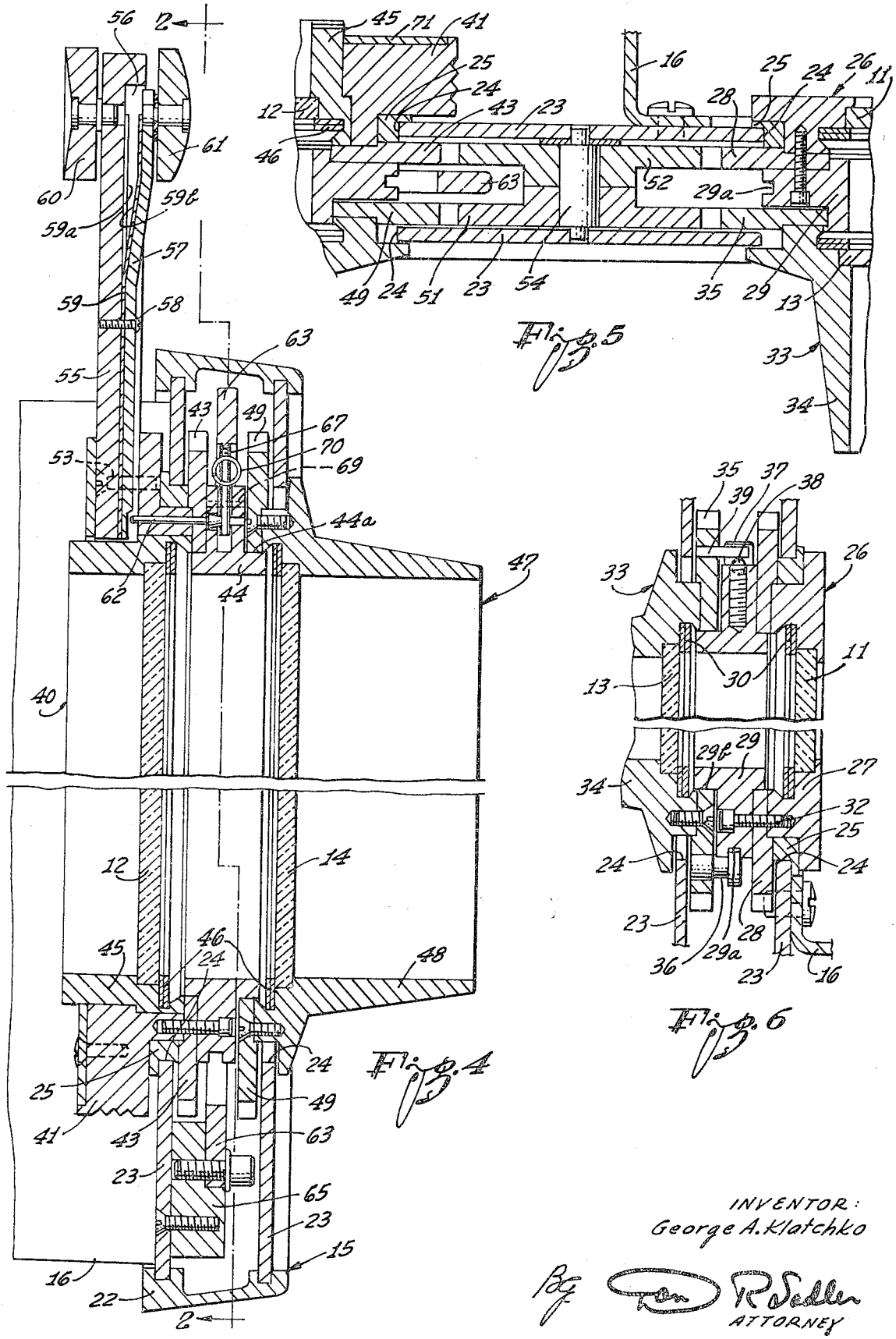

United States Patent Office 3,549,259
Patented Dec. 22, 1970

3,549,259
POLARISCOPE
George A. Klatchko, Levittown, Pa., assignor, by mesne assignments, to Automation Industries, Inc., a corporation of California
Original application Mar. 16, 1964, Ser. No. 352,143. Divided and this application Dec. 12, 1967, Ser. No. 712,879
Int. Cl. G01n 21/40; G02b 27/28
U.S. Cl. 356—115         5 Claims

ABSTRACT OF THE DISCLOSURE

Apparatus is disclosed including first and second jointly rotatable annular support means for carrying a polarizer and an analyzer, respectively, releasable lock means for locking said support means against rotation and two retardation plates mounted on said first and second support means in front of said polarizer and analyzer for joint rotation relative thereto, so that said apparatus functions as either a plane or circular polariscope.

---

This application is a division of copending application of Klatchko, Ser. No. 352,143, filed Mar. 16, 1964 for a polariscope.

This invention relates to a polariscope and, more particularly, to improved means for mounting the polarizing and retarding elements thereof.

As is well known, a polariscope is an instrument for photoelastic stress analysis by the use of polarized light and birefringent material, and one of the objects of the invention is to provide a polariscope having a polarizer, an analyzer, and two retardation plates, e.g. quarter-wave plates, with novel means for mounting and permitting simultaneous or independent rotation of a polarizer, an analyzer, and two retardation plates.

Another object is to provide a polariscope with novel locking means which, upon setting the polarizer, permits the analyzer and the retardation plates to be rotated without disturbing the setting of the polarizer.

Still another object is to provide a novel locking mechanism for a polariscope that releasably holds a rotatable element against rotation by developing relatively large locking forces in opposition to forces that tend to rotate the element, while requiring relatively little force to release the locking mechanism to permit rotation of the element.

Other objects and advantages of the invention will be apparent from the following description taken in connection with the accompanying drawings wherein:

FIG. 1 is a plan schematic view of a polariscope embodying the invention;

FIG. 2 is a transverse vertical sectional view looking along reference lines 2—2 of FIG. 4;

FIG. 3 is an enlarged detail view;

FIG. 4 is a vertical longitudinal sectional view along lines 4—4 of FIG. 2; and

FIG. 5 is an oblique longitudinal sectional view along lines 5—5 of FIG. 2; and

FIG. 6 is a vertical longitudinal sectional view along ref. lines 6—6 of FIG. 2.

Referring now to the drawings and first to FIG. 1 thereof, there is illustrated a polariscope 10 having a polarizer 11, an analyzer 12, and quarter-wave plates 13 and 14 mounted in front of the polarizer and analyzer respectively. These elements are supported on a frame 15 to which is attached a housing 16 enclosing a lamp 17 located rearwardly of polarizer 11 whereby light from the lamp is transmitted along a path extending through polarizer 11 and quarter-wave plate 13 in the direction of arrows 18 and incident to the surface of the object being analyzed. The object, not shown, is provided with a reflective surface coated with a transparent material that exhibits birefringence when subjected to strain. Light reflected from such surface is transmitted in the direction of arrows 19 through quarter-wave plate 14 and analyzer 12 where it can be visually observed from the rear of the analyzer or recorded as by the use of a camera 21.

Frame 15, FIG. 4, includes a rectangular frame molding 22 that extends around the front of the polariscope and supports front and rear plates 23 in a spaced relationship to each other. Each plate 23 is provided with two transversely spaced openings 24 axially aligned with corresponding openings 24 in the other plate. Frame 15 further comprises two annular bearings 25 press fitted or otherwise rigidly affixed in openings 24 of the rear plate 23.

As best seen in FIG. 6, polarizer 11 is an element of a rotatable polarizer cell 26 that also includes an annular cell ring 27 in which polarizer 11 is rigidly mounted by retaining rings 30 for rotation therewith. Cell ring 27 is connected to a main spur gear 28 and a quarter-wave carrier 29 by bolts 32, the gear 28 and ring 27 being engaged with bearing 25 whereby the inner, cylindrical surface of bearing 25 acts as a radial bearing for the polarizer cell and the axial, annular surfaces of bearing 25 act as thrust bearings to prevent axial movement of the cell relative to the frame. The polarizer cell is thus rotatably mounted on frame 15.

Rotatably mounted on the front of polarizer cell 26, FIGS. 5 and 6, is a quarter-wave cell 33 that includes a shade 34 within which quarter-wave plate 13 is mounted by retaining rings 30. Connected to shade 34 is a main spur gear 35 having mounted thereon a plurality of roller pins 36 provided with enlarged heads engaged in an outwardly-opening, peripheral groove 29a of the carrier to prevent relative axial movement between cells 26 and 33. Quarter-wave carrier 29 further includes a cylindrical bearing portion 29b that rotatably supports the inner surface of gear 35 whereby cell 33 is rotatably supported on cell 26.

Carrier 29 comprises two radial stop screws 37 having adjacent surfaces angularly spaced for engagement with a stop pin 39 carried on gear 35, whereby the stop pin is angularly movable through 45°, the limits of such movement being fixed by stop screws 37. Carrier 29 further comprises two spring-biased, ball detents 38 that are operative to releasably hold stop pin 39 against the associated stop screw when engaged therewith, whereby both quarter-wave cells can be rotated in either direction upon rotation of cell 26. The detents thus couple quarter-wave cell 33 to polarizer cell 26 for rotation therewith while allowing the quarter-wave cell 33 to be rotated through 45° relative to cell 26 upon overcoming the detent force or torque due to each ball detent 38 and the friction of the elements. Obviously, the detent force or torque is greater than the frictional force or torque encountered in rotating the quarter-wave cells.

On the analyzer side of the frame, as set forth in FIG. 4 there is mounted an analyzer cell 40 which is similar to the polarizer cell except that, as pointed out hereafter, analyzer 12 is rotatable relative to cell 40 whereas the polarizer is fixed relative to its cell, and the analyzer cell is provided with a handle and locking means described below. Analyzer cell 40 comprises a ring 41 connected to a gear 43 and a quarter-wave carrier 44. Ring 41 and gear 43 are slidably engaged with bearing 25 so that the analyzer cell 40 is rotatably mounted on the frame. Cell 40 further includes an inner ring 45 within which analyzer 12 is rigidly mounted by retaining rings 46, the ring 45 being rotatably mounted in ring 41 in frictional engagement therewith.

A quarter-wave cell 47 is rotatably mounted on analyzer cell 40 in front thereof, the quarter-wave cell being substantially identical to quarter-wave cell 33 and comprising a shade 48 connected to a spur gear 49 having mounted thereon a plurality of angularly spaced roller pins 50 engaged in a U-shaped groove around the periphery of quarter-wave carrier 44. The inner surface or edge of gear 49 is rotatably supported on a bearing 44a of the quarter-wave carrier 44. Quarter-wave plate 14 is mounted in shade 48 by retaining rings 46.

Two idler gears 51 and 52 as set forth in FIG. 5 are mounted on a shaft 54 extending between plates 23 midway between the analyzer side and the polarizer side of the frame. Idler gear 51 is engaged with gears 49 and 35 of the quarter-wave cells whereby the cells are positively inter-connected for simultaneous, synchronous rotation in the same direction. Gear 52 is engaged with gears 28 and 43 whereby the analyzer cell and the polarizer cell are positively interconnected for simultaneous rotation in the same direction.

A radial handle or arm 55 as set forth in FIG. 4 is attached at its inner end, by screws 53, to ring 41. Handle 55 has a longitudinal, forwardly opening groove 56 in which is mounted a lever 57 loosely fulcrumed about a pivot 58 connected to arm 55. Lever 57 is bent intermediate to its ends to provide a rocking motion about its fulcrum at pivot 58. A spring 59 is also disposed in groove 56 and biases lever 57, clockwise as viewed in FIG. 4, so that the upper end thereof is biased forwardly. Spring 59 is a split leaf type spring having arms 59a abutting the bottom of groove 56 and an arm 59b abutting lever 57 and located between arms 59a. A rotary button 60 is mounted on the outer end of arm 55 and a rotary button 61 is mounted on the outer end of lever 57. In operation, the buttons can be grasped between the thumb and forefinger of a user and pinched together to release the locking means. The handle can then be rotated to rotate the cells of the polariscope. The inner end of lever 57 is engageable with a release pin 62 slidably mounted in and extending through rings 41 and near 43.

A circular lock ring 63 is affixed to frame 15 concentric to quarter-wave carrier 44 and spaced radially outwardly thereof, the lock ring being rigidly mounted on a plurality of angularly spaced mounting blocks 65 attached to the rear plate 23. Lock ring 63 is engageable with two locking elements or sprags 66 and 67 pivotally mounted in an arcuate peripheral recess 44b of quarter-wave carrier 44 by pivot pins 68 and 69. Sprags 66 and 67 are mounted back-to-back and a compression spring 70 extends between adjacent edges thereof near the outer ends and biases the outer ends of the sprags apart towards engagement with ring 63. The adjacent edges of the sprags are bevelled at their lower ends for engagement with the tapered head of pin 62 whereby upon pinching buttons 61 and 62 together, lever 57 moves pin 62 so as to wedge its head between the lower ends of the sprags and cam the sprags about their respective pivot pins so that the upper ends move towards each other against the bias of spring 70 and out of engagement with lock ring 63. Upon release of buttons 60 and 61, spring 59 moves lever 57 to its inoperative position and the spring 70, because of the bevelled edges of the sprags and the taper of the head of pin 62, moves pin 62 to its inoperative position and sprags 66 and 67 into locking engagement with ring 63.

With reference to FIG. 3 wherein the inoperative positions of the sprags are illustrated by the full lines and the operative positions are illustrated by the dotted lines, it will be seen that the locking mechanism of the invention is of a progressive self energization type for preventing rotation of quarter-wave carrier 44, and the elements connected thereto, in either direction when sprags 66 and 67 are engaged with ring 63, sprag 66 being effective to prevent rotation of carrier 44 in the clockwise direction as viewed in FIG. 3 and sprag 67 being effective to prevent rotation of the counterclockwise direction as viewed in FIG. 3. In the absence of the other sprag, each sprag would be overridden in the opposite direction.

To accomplish the self-energization, the outer edge of each sprag has a radius of curvature R less than the radius of curvature of ring 63 and the center of curvature, indicated approximately at the + on sprag 66 in FIG. 3, is located radially inwardly of a point on a line drawn between the centers of pivot pins 68 and 69 so that upon movement of each sprag from its inoperative position to its operative position, the sprag engaged ring 63 at a point located on a radial line A that is angularly spaced from a line B which passes through the point of contact and the respective pivot pin upon which the sprag is mounted. Since the coefficient of friction is dependent upon the materials, the materials of ring 63 and of the sprags are selected so that the coefficient of friction is greater than the tangent of the angle between lines A and B whereby the relatively small biasing force of spring 70 can produce a locking force of a much greater magnitude than would be equal to but opposite in direction from any force tending to produce relative rotation between ring 63 and carrier 64. To release the locking mechanism, then, only the relatively small force due to the bias of spring 70 need be overcome.

An annular dial plate 71 set forth in FIG. 5 is mounted on the rear face of ring 41 in association with a pointer on the rear face of ring 45 for providing fractional or decimal readings of fractional fringe orders of the isochromatics. As should be obvious, it is only necessary to rotate the analyzer and polarizer a maximum of 180° so that the dial plate is provided with a zero marking intermediate the ends of its arc of rotation and is calibrated in one hundred units over 180° arcs extending in both directions from the zero marking. At the zero setting of the analyzer 12, the analyzer is crossed with polarizer 11 in a manner well known in the art. Quarter-wave plates 13 and 14 are mounted so that their optic axes are parallel to the optic axes of the analyzer 12 and polarizer 11 when the quarter-wave plates are held by one of the detent balls 38 in one of their limiting positions so that rotation from this position through an angle of 45° also rotates the optics axes of the quarter-wave plates through 45° and thereby renders the plates operative. Thus, although the quarter-wave plates are physically located along the paths of the incident light 18 and reflected light 19, they can be optically placed in and out of operation simply by rotating them through the 45° wherein in one position they are effective to circularly polarize linearly polarized light and in the other position they simply pass the linearly polarized light.

In operation, all cells can be rotated simultaneously by pinching buttons 60 and 61 to release the locking mechanism and by turning arm 55. Such action positively rotates each cell although the analyzer 12 is merely rotated through frictional engagement with the analyzer cell. Upon releasing the buttons, the locking mechanism operates to prevent rotation of polarizer 11 while allowing independent rotation of the analyzer and the quarter-wave plates relative thereto. Thus, analyzer 12 can be rotated simply by grasping the rearwardly extending portion of ring 45 and turning it to the desired position by overcoming the friction associated therewith. The quarter-wave plates can be rotated between their operative and inoperative positions by grasping and turning either of shades 34 or 38 so as to overcome the detent force of the engaged ball detent 38 and the friction force associated therewith.

Polariscope 10 can be used by itself for normal incidence analysis or it can be used, with the aid of a conventional attachment, for oblique incidence analysis. During normal incidence analysis, the polariscope can be operated as follows. First, analyzer 12 is set to its zero position, i.e., crossed with polarizer 11, and the quarter-wave plates 13 and 14 are rotated to their inoperative positions if they are not already in such positions. Next, lamp 17 is turned on so that isoclinics can be seen from the rear of analyzer 12. Then, to determine the direction of the principal strain at any point, the polarizer, analyzer and quarter-wave plates are simultaneously rotated in the manner previously described until an isoclinic crosses the point in question. To determine the magnitude of the principal strain difference at such a point, the quarter-wave plates 13 and 14 are rotated to their operative positions to remove the isoclinics and create isochromatics. If the point being analyzed does not lie on an integral fringe order, the analyzer 12 is rotated in the appropriate direction until the integral fringe order lies on the point in question whereupon the fractional fringe order can be read directly from dial plate 71.

While only a single embodiment has been illustrated it will be apparent to those skilled in the art that many changes can be made in the details and arrangements without departing from the scope of the invention as defined in the appended claims.

What is claimed is:
1. In a polariscope, the combination of:
a frame;
first and second annular support means rotatably mounted on said frame adjacent to each other, said support means being positively coupled for simultaneous rotation in the same direction;
a radial handle for rotating said support means;
releasable lock means for locking said support means against rotation, said lock means comprising; a lock ring being affixed to said frame concentric to one of said supported means, a pair of self-energizing locking elements pivotally mounted on said one support means and engageable with said lock ring, and means for disengaging said locking elements from said lock ring in response to actuation of an actuating means;
actuating means mounted on said handle for releasing said lock means;
a polarizer affixed to said first support means;
an analyzer carried by said second support means and being frictionally coupled thereto for rotation therewith in response to rotation of said handle and for selective rotation relative thereto when said support means are locked against rotation;
two retardation plates operably rotatably mounted on said first and second support means, respectively, in front of and in axial alignment with said polarizer and said analyzer said retardation plates being coupled to each other for simultaneous rotation; and
two angularly spaced detents mounted on one of said support means and being operable to hold said retardation plates in either of two angularly displaced positions.

2. The combination of claim 1 wherein said actuating means comprises a lever pivotally mounted on said handle, and a spring biasing said lever towards a position wherein said lock means is locked.

3. In a polariscope the combination of:
a frame;
a first and second annular support means rotatably mounted on said frame adjacent to each other, said support means being positively coupled for simultaneous rotation in the same direction;
a radial handle for rotating said support means;
releasable lock means for locking said support means against rotation, said lock means comprising a lock ring affixed to said frame concentric to one of said support means, a pair of self-energizing locking elements pivotally mounted on said one support means and engageable with said lock ring, a spring biasing said locking elements into engagement with said lock ring, and means for disengaging said locking elements from said lock ring in response to actuating of said actuating means;
actuating means mounted on said handle for releasing said lock means;
a polarizer affixed to said first support means;
an analyzer carried by said second support means and being frictionally coupled thereto for rotation therewith in response to rotation of said handle and for selective rotation relative thereto when said support means are locked against rotation; and
two retardation plates operably rotatably mounted on said first and second support means, respectively, in front of and in axial alignment with said polarizer and said analyzer.

4. The combination as defined in claim 3 wherein said retardation plates are coupled to each other for simultaneous rotation.

5. The combination as defined in claim 3 wherein said actuating means comprises a lever pivotally mounted on said handle and a spring biasing said lever towards a position wherein said lock means is locked.

References Cited
UNITED STATES PATENTS

| | | | |
|---|---|---|---|
| 2,399,658 | 5/1946 | Banker | 350—159 |
| 2,730,007 | 1/1956 | Chapman | 356—33 |
| 3,062,087 | 11/1962 | Zandman et al. | 356—33 |
| 3,218,912 | 11/1965 | Minoura et al. | 356—33 |
| 3,293,908 | 12/1966 | Chapman | 356—33 |
| 3,373,652 | 3/1968 | Flader | 356—33 |
| 3,177,761 | 4/1965 | Redner | 356—115 |

FOREIGN PATENTS

| | | | |
|---|---|---|---|
| 676,725 | 1952 | Great Britain | 356—115 |

RONALD L. WIBERT, Primary Examiner

J. ROTHENBERG, Assistant Examiner

U.S. Cl. X.R.

350—159; 356—33, 118